United States Patent
Henrich et al.

(10) Patent No.: US 11,554,920 B2
(45) Date of Patent: Jan. 17, 2023

(54) METHOD AND DEVICE FOR MANAGING A UNIT SORTING MODULE

(71) Applicant: SIDEL ENGINEERING & CONVEYING SOLUTIONS, Reichstett (FR)

(72) Inventors: Benoît Henrich, Reichstett (FR); Emmanuel Roth, Reichstett (FR)

(73) Assignee: SIDEL ENGINEERING & CONVEYING SOLUTIONS, Reichstett (FR)

(*) Notice: Subject to any disclaimer, the term of this patent is extended or adjusted under 35 U.S.C. 154(b) by 0 days.

(21) Appl. No.: 16/626,957

(22) PCT Filed: Jun. 26, 2018

(86) PCT No.: PCT/FR2018/051545
§ 371 (c)(1),
(2) Date: Dec. 27, 2019

(87) PCT Pub. No.: WO2019/002744
PCT Pub. Date: Jan. 3, 2019

(65) Prior Publication Data
US 2020/0172344 A1    Jun. 4, 2020

(30) Foreign Application Priority Data
Jun. 29, 2017    (FR) ...................................... 1756026

(51) Int. Cl.
*B65G 43/08*    (2006.01)
*B65G 47/14*    (2006.01)
(Continued)

(52) U.S. Cl.
CPC ......... *B65G 43/08* (2013.01); *B65G 47/1471* (2013.01); *B65G 43/10* (2013.01);
(Continued)

(58) Field of Classification Search
CPC ..... B65G 43/08; B65G 43/10; B65G 47/1471
See application file for complete search history.

(56) References Cited

U.S. PATENT DOCUMENTS

| | | | | |
|---|---|---|---|---|
| 2,745,537 A | * | 5/1956 | Cadman | B65G 47/1471 198/397.01 |
| 5,394,972 A | * | 3/1995 | Aidlin | B65G 47/1471 198/393 |

(Continued)

FOREIGN PATENT DOCUMENTS

| | | |
|---|---|---|
| AT | 13016 U1 | 4/2013 |
| DE | 102004030667 A1 | 1/2006 |

(Continued)

OTHER PUBLICATIONS

International Search Report for International Application PCT/FR2018/051545 dated Oct. 22, 2018.

*Primary Examiner* — William R Harp

(57) ABSTRACT

The invention relates to a method for managing a module for sorting units, which involves arranging said units loose in a reservoir; sorting said units according to a specific orientation into a batch inserted into a housing, by lifting from said reservoir towards an exit at an elevation speed; expelling said batch of sorted units from said outlet towards an entrance of a supply column, said expelled units passing through a circulation area situated between said exit and said entrance. The method comprising, at said circulation area, detecting the number of units expelled in each batch; accelerating or decelerating the elevation speed depending on said number of units detected. The invention also concerns a corresponding management device.

12 Claims, 1 Drawing Sheet

(51) Int. Cl.
*B65G 43/10* (2006.01)
*B65G 47/31* (2006.01)
*B67B 3/064* (2006.01)

(52) U.S. Cl.
CPC ...... *B65G 47/31* (2013.01); *B65G 2201/0235* (2013.01); *B65G 2203/0208* (2013.01); *B65G 2203/042* (2013.01); *B67B 3/0645* (2013.01)

(56) References Cited

U.S. PATENT DOCUMENTS

| | | | | |
|---|---|---|---|---|
| 8,783,439 | B2* | 7/2014 | Lopez | B65G 37/00 |
| | | | | 198/397.01 |
| 9,139,378 | B2* | 9/2015 | Lopez | B67B 3/0645 |
| 10,343,852 | B2* | 7/2019 | Roth | B65G 47/1471 |
| 10,501,268 | B2* | 12/2019 | Roth | B67B 3/062 |
| 2011/0142731 | A1 | 6/2011 | Beckmann | |
| 2013/0098812 | A1* | 4/2013 | Lopez | B65G 47/256 |
| | | | | 209/617 |
| 2017/0349382 | A1* | 12/2017 | Roth | B65G 47/57 |

FOREIGN PATENT DOCUMENTS

| | | |
|---|---|---|
| DE | 102009015618 A1 | 11/2010 |
| EP | 2588394 A1 | 5/2013 |
| FR | 2961801 A1 | 12/2011 |
| WO | 2016107655 A1 | 7/2016 |

\* cited by examiner

METHOD AND DEVICE FOR MANAGING A UNIT SORTING MODULE

FIELD OF INVENTION

The present invention lies in the field of the sorted supply of units within a production line.

BACKGROUND OF THE INVENTION

In a nonlimiting manner, such units include closure units of the cap or stopper type that are intended to close an opening present in containers, in particular glass or plastic bottles, cardboard cartons. Such closure units generally have a flatted tubular overall shape.

Such units also include units for manufacturing plastic containers conventionally formed by blow molding or stretch blow molding from preforms. Such preform-type units generally have a substantially cylindrical body closed by a hemispherical end and, at the opposite end, an open neck that is separated from the body by a collar and has its final shape.

In a known manner, the sorted supply of stoppers or caps within a production line takes place via a sorting module, at the inlet of which said stoppers or caps are poured in loose form into a reservoir, in particular a hopper. This module sorts these stoppers or caps so as to dispose them in a suitable position in order then to supply sorted stoppers or caps continuously to a module situated downstream on the production line, for example a capping module or a module for sterilizing closure units. In other words, a sorting module makes it possible to take stoppers or caps that are initially in a jumble and to arrange them in one or more ordered lines. Such a sorting module is generally known as a "cap feeder".

An example of a sorting module is described in the documents U.S. Pat. No. 5,394,972 and EP 2 588 394. In its lower part, it comprises a reservoir that receives stoppers in loose form and, passing through said reservoir, a vertically oriented endless conveyor that is driven so as to extract and lift said stoppers. More specifically, said conveyor has a series of juxtaposed cleats, said cleats comprising housings that extend transversely, from one side to the other, corresponding to the diameters of said stoppers to be picked from the reservoir. In addition, the spacing, the inclination of the conveyor, the configuration, and the dimensions of said cleats ensure that said picked stoppers are positioned in a given manner. Specifically, a stopper that is positioned in a configuration other than the one desired, for example upside down or in a staggered manner with respect to the other stoppers, is off balance and naturally drops under the effect of gravity during the vertical movement of said conveyor, thereby ensuring that, once they have arrived at the end of travel, the only stoppers that remain within the housings are those that are sorted and arranged in the chosen configuration. This sorting technique is commonly known as the "waterfall" technique.

At this point, it should be noted that sorting takes place in a random manner, depending on the number of stoppers or caps that are aligned correctly in each housing of the conveyor. Specifically, correct positioning of the stoppers within a housing depends on their insertion from the loose position within the reservoir. Thus, a housing can have no stoppers if none of them is positioned correctly, while the following housing may be full, or contain a number of stoppers that it is not possible to determine in advance.

Once sorted and aligned, these stoppers are transferred in line towards a supply station. To this end, several existing systems can be employed, using means for successively expelling each line of aligned stoppers contained with each housing. Such expulsion means can be provided in a mechanical manner, in the form of a pusher that is movable in translation longitudinally along and inside each housing, from one end to the opposite, extraction end, pushing each line of stoppers toward this outlet end. They can also be provided in a pneumatic manner, in the form of a jet of compressed air that is oriented in the same way, thereby driving the stoppers toward the extraction end.

Another, related technique, as described in the document EP 2 588 394, consists in modifying the orientation of each housing in order to dispose it vertically at the end of travel of said conveyor, naturally ensuring the expulsion of the lines of stoppers by sliding downward under the effect of gravity.

Furthermore, once sorted, the closure units are aligned, notably within at least one column, from which they are transferred at a rate depending on the downstream module that needs to be supplied continuously. Thus, it is necessary to ensure that the column is always filled, i.e. that it contains enough stoppers or caps to ensure the supply at the required rate. On the other hand, since the column has a finite length, excessive filling with stoppers causes it to overflow, the following stoppers being returned to the reservoir, resulting in unnecessary sorting. This level of filling thus depends on the quantity of sorted stoppers expelled by the sorting module.

There currently exist detectors that are positioned at the height of said column, at strategic locations, making it possible to check the filling level thereof by detecting whether or not a stopper is present at a particular height of the column. In particular, a sensor situated in the bottom part makes it possible to detect whether the column is almost empty, while a sensor situated in the upper part indicates when the column is almost completely full. Another sensor can be positioned at an intermediate height, centered toward the top, said sensor periodically detecting suitable filling for the required rate. Thus, depending on the data detected, namely the presence of a stopper at a defined height of the column, it is possible to automatically control the speed of the conveyor, increasing it to receive more sorted stoppers or, conversely, decreasing it in the event of excessive filling.

A major drawback resides in the lag between the detection and required action of increasing or decreasing the speed. Specifically, changing the speed of the conveyor does not make it possible, on account of the random number of sorted stoppers present within each housing, to ensure that there is a given quantity of stoppers that is necessary for proper filling of the column, i.e. neither to many nor too few.

Thus, the ignorance of the number of sorted stoppers expelled at the outlet of the sorting module brings about an adaptation time lag that is prejudicial to the supply and yield of the production line, in particular if said supply has to occur at a high rate (for example a flow of closure units greater than around 45 000 stoppers per hour).

SUMMARY OF THE INVENTION

The aim of the invention is to remedy the drawbacks of the prior art by proposing the precise determination of the number of closure units expelled by the sorting module so as to anticipate the level of filling of the column, reducing the time lag by controlling the increase and decrease in speed of the conveyor in a reactive manner.

For this purpose, the invention provides for the detection and deduction of the number of stoppers at each expulsion, in a circulation zone situated between the outlet of the sorting module and the inlet of said column.

To this end, the invention relates to a method for managing a module for sorting units of the stopper or cap or preform type, wherein:

said units are placed in loose form in a reservoir;
said units are sorted in an oriented manner into at least one batch inserted into at least one housing by being lifted from said reservoir toward an outlet at a lifting speed;
said batch of sorted units is expelled from said outlet of said housing toward an inlet of at least one supply column, said expelled units passing through a circulation zone situated between said outlet and said inlet.

Such a method is characterized in that it comprises:
detecting, in said circulation zone, the number of expelled units per batch;
increasing or decreasing the lifting speed depending in particular on said detected number of units. Additionally, but in a nonlimiting manner, such a method can comprise detecting the number of expelled units per batch at said outlet, at said inlet and/or at an intermediate point along said circulation zone.

According to a first embodiment, said method may comprise a step of expelling the units of a batch pneumatically and detecting said units individually by counting.

According to another embodiment, said method may comprise a step of expelling the units of a batch mechanically by pushing them in an indexed manner from one end as far as said outlet and detecting said units:

individually by counting; and/or
by calculating the number of units between said outlet and the indexed position at the time of said pushing.

The invention also relates to a device for providing units, which comprises a module for sorting units of the stopper or cap or preform type, said sorting module being provided with a reservoir that receives said units and with a conveyor that is disposed upwardly and is driven at a lifting speed, said conveyor comprising at least one housing for receiving said units in the form of a batch by insertion, said sorting module also comprising an outlet and means for expelling toward said outlet each batch of units inserted into each housing, said sorting module comprising a supply column provided with an inlet and a circulation zone for said units that is situated between said outlet and said inlet.

Such a device is characterized in that it comprises:
means for detecting in particular the number of units in each batch, said detection means having at least one sensor situated in said circulation zone;
control means for controlling the increase and the decrease in the lifting speed of said conveyor depending on the number of units detected.

Additionally, but in a nonlimiting manner, said detection means may comprise at least one sensor situated at said outlet, at said inlet and/or at an intermediate point along said circulation zone.

According to a first embodiment, said expulsion means may comprise a pneumatic ejector, and at least one sensor of said detection means that comprises at least one counting cell.

According to another embodiment, said expulsion means may comprise a mechanical ejector in the form of a pusher that is movable in translation according to indexed positions along said housing, and at least one sensor of said detection means comprises:

at least one counting cell; and/or
a cell for detecting the presence of a unit at said outlet, said detection means comprising means for calculating the number of units between said outlet and said pusher at an indexed pushing position.

Therefore, the invention makes it possible to anticipate as closely as possible the number of sorted units expelled by a sorting module, in order to adapt rapidly and effectively to the supply module for the rest of the production line.

In a complementary manner, the management according to the invention makes it possible to improve the supply yields of units, in particular at a high rate. Hence, it is possible to optimize the speeds of operation of the sorting module and of the modules situated downstream and supplied in this way. It then becomes possible, through the optimization of this supply flow, to reduce the space requirement between the different modules, for example to reduce the size of the collection buffer spaces for said units.

BRIEF DESCRIPTION OF THE DRAWINGS

Further features and advantages of the invention will become apparent from the following detailed description of nonlimiting embodiments of the invention.

DETAILED DESCRIPTION

The present invention relates to the management of a sorting module 1 for closure units 2 for containers.

In the rest of the description, the expression "closure unit 2" is in no way limited to a stopper or a cap, this expression also encompasses a preform from which a container is formed.

As mentioned above, said closure units 2 can be of the stopper or cap or preform type and are intended to close a container, generally filled with a liquid, in a leaktight manner. Such closure units 2 have to be sorted into a specific position and/or specific orientation in order to supply, in the form of a preferably continuous flow, in this specific position and/or specific orientation, a module that is situated downstream and has the role of closing off said containers.

Figure 1:
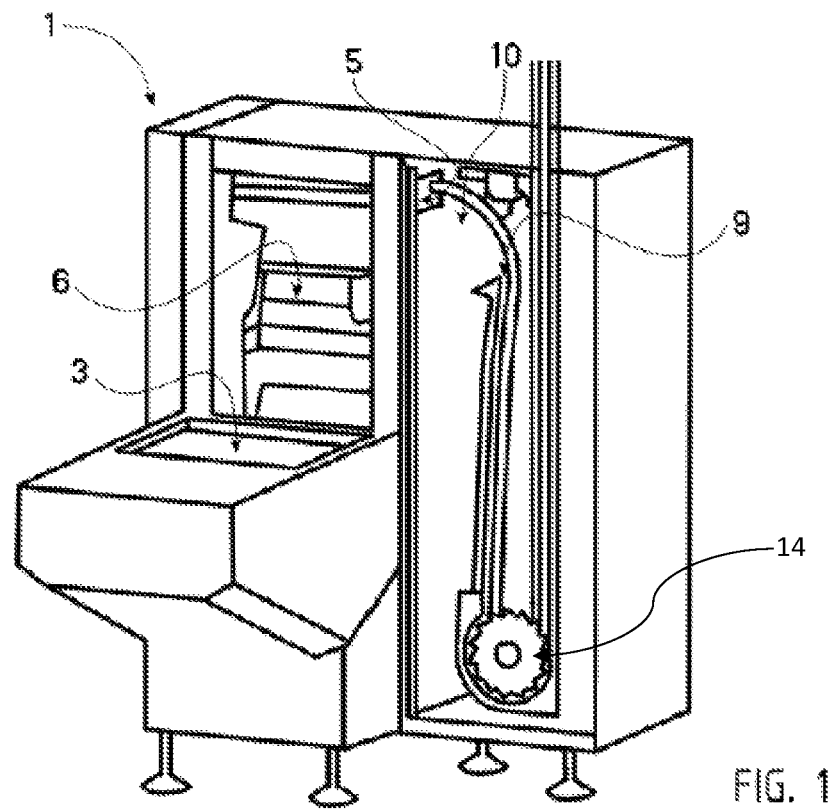
FIG. 1 schematically shows a perspective view of an example of a sorting module for closure units of the "waterfall" type, within which the invention is implemented.

An example of a sorting module 1 is shown schematically in FIG. 1. In particular, in a nonlimiting manner, such a sorting module 1 comprises a reservoir 3, commonly in the form of a hopper, within which said closure units 2 are disposed in loose form.

Starting from this jumbled mass contained in the reservoir 3, said closure units 2 are sorted in an oriented manner into at least one batch, preferably several batches. Each batch thus has one or more units 2. Each batch is inserted into at least one housing 4. It is the configuration of each housing 4 that makes it possible, depending on the characteristics of the closure units 2, such as their shape, their weight or their center of gravity, to allow them to be inserted into each housing 4 in said specific position.

The insertion of a batch of units 2 into its housing 4 is carried out by lifting from said reservoir 3. For this purpose, suitable means extend from the outside to the inside of the reservoir 3 and are made to move so as to dip into the loose mass of closure units 2, to successively collect batches in order to extract them from said reservoir 3.

Preferably, such suitable means can be in the form of a conveyor 6. The latter extends vertically or substantially vertically. In particular, said conveyor 6 is inclined with respect to the vertical, at a given angle depending on the characteristics of the units to be sorted. This inclination is effected toward the bottom or rear, away from the reservoir 3. Such a conveyor 6 is provided in an endless manner and may be made up of a belt wound around at least one driven roller and at least one return roller. It is this belt that receives at least one housing 4, preferably a plurality of spaced apart housings, at regular or irregular intervals.

Figure 2:
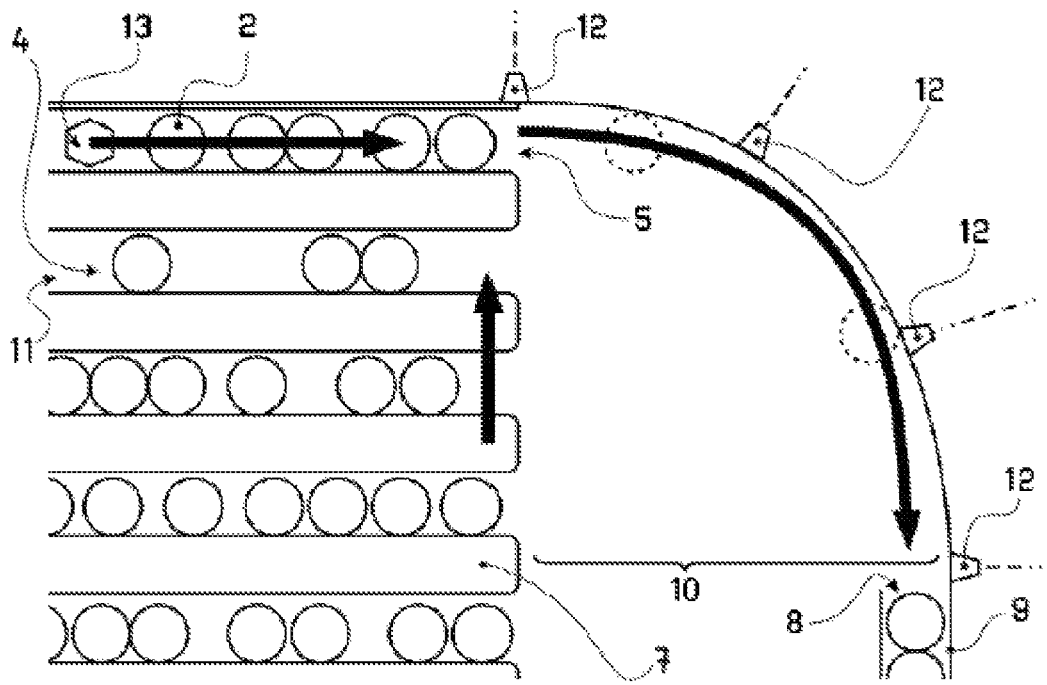
FIG. 2 schematically shows a detail of FIG. 1, specifically showing a circulation zone of the units and examples of possible installation points of the detection means of the invention.

According to the embodiment shown in FIG. 2, said housings 4 can be formed by cleats 7. Said cleats 7 extend transversely with respect to said belt, in a mutually parallel or substantially mutually parallel manner. The cleats 7 are spaced apart and positioned precisely, delimiting at least one housing 4 between one another.

Thus, several closure units 2 can be inserted into each housing 4 as it passes through the reservoir 3. As each housing 4 is being lifted, badly introduced closure units 2, which are in an unsuitable position, are balanced precariously, falling forward into the reservoir 3, forming a virtually continuous downfall which, by mimicry, confers the name "waterfall" on said sorting module module 1.

The lifting of the closure units 2 within their housing 4 is thus carried out at a lifting speed. This lifting speed can be increased or decreased by acting on the drive speed of the conveyor. As mentioned above, the increase and decrease in speed depend on the sorted number of closure units 2 leaving said sorting module 1 and the production rate required by the downstream module.

Hence, lifting takes place toward an outlet 5 at said lifting speed. More specifically, each housing 4 is driven upward at said lifting speed until it is positioned next to said outlet 5.

Thus, said batch of sorted closure units 2 is expelled from said outlet 5 of said housing 4 toward an inlet 8 of at least one supply column 9. In sum, when each housing 4 is brought up to the outlet 5, the batch of closure units 2 contained within said housing 4 is passed through the outlet 5. In particular, as can be seen in FIG. 2, a batch is made up of one or more aligned closure units 2 and the expulsion consists in driving these closure units 2 one after another.

For this purpose, expulsion means 13 are integrated into an ejection zone situated in the top part of the conveyor 6, in alignment with the outlet 5. Said expulsion means 13 thus ensure the ejection of all the closure units 2 present within each housing 4 when the latter arrives at said outlet 5.

According to a first embodiment, the closure units 2 of a batch are expelled pneumatically. In other words, compressed air is sent through the housing 4, from the opposite end 11 from the end situated next to the outlet 5, such that the closure units 2 are ejected under the impulse of the air injected in this way. The force and the orientation of the air thus pulsed is determined to allow the ejection of a single unit up to a whole batch of closure units 2.

According to another embodiment, the closure units 2 of a batch are expelled mechanically by being pushed in an indexed manner from one end as far as said outlet 5. In other words, this type of ejection is effected by moving, from said opposite end 11 as far as the outlet 5, at least one ejector that is movable in translation along said housing 4. This ejector hits the first closure unit 2 that it meets, pushing it against the next one (if one has been inserted into said housing 4, and so on against the following ones) until it has been moved to the end of travel at the end of the housing 4, at the outlet 5, ensuring that no closure unit 2 remains in the housing 4.

Said expelled closure units 2 then pass through a circulation zone 10 situated between said outlet 5 and said inlet 8. In other words, said circulation zone 10 serves as a transit space along and through which a line of closure units 2 circulates. The line thus corresponds to a sequential series of closure units 2 of an expelled batch.

According to the exemplary embodiment shown in FIG. 2, said circulation zone 10 has a concave curved shape. This curvature of the circulation zone 10 serves to guide the expelled closure units 2 in order to channel them along a horizontal or substantially horizontal path at the outlet 5 to a vertical or substantially vertical path at the inlet 8. Said curvature can vary depending on the characteristics of the closure units 2, in particular their shape, and on the position of said outlet 5 and the inlet 8 of the supply column 9.

Advantageously, the invention consists in detecting, in said circulation zone 10, the number of closure units 2 expelled per batch. In other words, the quantity of closure units 2 of each line is detected at the time of their expulsion from their housing 4, when they pass through the circulation zone 10. Thus, the exact number of expelled closure units 2 that are sent toward the supply column 9 is known even before they collect there, meaning that the closure units 2 are stacked to the height of the supply column 9.

For this purpose, the invention provides means for detecting the number of closure units 2 in each batch, said detection means having at least one sensor 12 situated in said circulation zone 10.

Preferably, according to different embodiments, it is possible to detect the number of closure units 2 expelled per batch at said outlet 5, at said inlet 8 and/or at an intermediate point along said circulation zone 10.

For this purpose, the detection means may comprise at least one sensor 12 positioned accordingly at said outlet 5, at said inlet 8 and/or at an intermediate point along said circulation zone 10.

By way of entirely nonlimiting example, FIG. 2 shows four possible positions for detection with a sensor 12 positioned next to the outlet 5, one at the inlet 8 and two in two intermediate positions more or less at each third of the length of the circulation zone 10. Other positions for one or more sensors may be envisioned within the circulation zone 10.

As mentioned above, according to a first embodiment, when the closure units 2 of a batch are expelled pneumatically, said closure units 2 are detected individually by counting. Therefore, the expulsion means have a pneumatic ejector and a sensor 12 of said detection means consists of at least one counting cell. In other words, when the closure units 2 are expelled by means of pulsed or pressurized air, the closure units 2 that pass in front of the sensor(s) in the form of this counting cell are counted.

According to another embodiment, when the closure units 2 are expelled mechanically, by being pushed along the housing 4, it is also possible to detect them by counting.

A complementary or alternative detection solution may consist in expelling the closure units 2 of a batch mechanically by pushing them in an indexed manner from one end as far as said outlet 5 and in detecting said closure units 2 by calculating the number of closure units 2 between said outlet 5 and the indexed position at the time of said pushing. In other words, during the movement of the ejector, which comes into contact with a first closure unit 2 (situated on the left in FIG. 2) and pushes it against the next one (if one is present within the housing) until all of the closure units 2 present in said housing 4 are in contact and the closure unit 2 moved to the outlet 5 (on the right in FIG. 2) is expelled, the position of said ejector is registered and, depending on this indexed position, the number of closure units 2 contained between said ejector and the outlet 5 is calculated. In sum, depending on the distance between the ejector and the sensor 12, and depending on the dimension (in particular the diameter) of the closure units 2, the number of stoppers contained in the housing 4 and in the process of being expelled is determined by a simple division calculation. Therefore, it is necessary for a sensor 12, in the form of a presence detection cell, to be placed at said outlet 5. In addition, the position of this sensor 12 is perfectly defined with respect to the travel of the ejector of the expulsion means 13, in order to determine the length between the indexed position, thus known, of said ejector and the detection position of the cell, namely the position corresponding to the orientation of its detection beam.

Moreover, in this configuration of the invention, where the closure units 2 expelled mechanically are calculated, the detection means then comprise calculation means provided to this end, in order to determine the exact number of closure units 2 between said outlet 5 and said pusher at an indexed pushing position.

In this respect, the pushing time of the ejector corresponds to the indexed position, where, as mentioned above, all of the closure units 2 present within a housing 4 are moved by said ejector and pushed against one another, until the closure unit 2 situated at the end of the line (i.e. on the right) passes in front of the cell for detecting its presence.

Once the number of closure units 2 of each batch that are expelled from one or more housings 4 is known, these being counted successively by addition, the level of filling of the supply column 9 is known as soon as possible. Therefore, it is possible to increase or decrease the lifting speed depending on said detected number of closure units.

For this purpose, the invention provides means for controlling the increase and decrease in the lifting speed of said conveyor 6 depending on the number of closure units 2 detected.

It should be noted that the management means, only the sensors 12 of which are shown in the example in FIG. 2, may be computerized and centralized, connected by wires or wirelessly, to the control means, and to the other elements that make up the sorting module and the various components thereof.

All of the means employed and described above can be integrated into a device for managing a sorting module 1 for closure units 2, of the stopper or cap type, as mentioned above.

The supply column 9, as its name implies, is substantially vertical, if not vertical.

As is apparent from the above, it is intended to collect units 2 for the processing thereof with a downstream machine. Thus, this column 9 is a drop column 9, meaning that the units 2 circulate therein from top to bottom. Thus, the units 2 are lifted in batches within a housing 4, which extends horizontally in principle, in order to be sorted in an oriented manner. When a batch arrives at the outlet 5, the units are then at the top of the conveyor 6. The oriented batch is then expelled toward the supply column 9.

For this purpose, the batch is ejected substantially horizontally toward a lateral edge of the conveyor 6. The units that follow one another then pass through the circulation zone 10 and then arrive at the column 9. The upstream end of the circulation zone is thus located in principle at a lateral edge of the conveyor 6. The downstream end of the circulation zone 10 corresponds in principle to the inlet of the column 9, that is to say to the top part of the column 9. In other words, the circulation zone 10 makes it possible to change the direction of circulation of the units 2 to allow the batch to pass from a substantially horizontal arrangement (within the housing 4) to a substantially vertical arrangement (within the column). Such a zone thus in principle adjoins the conveyor 6 at its upstream end and the column 9 at its downstream end.

The circulation zone is thus generally curved. At the inlet 8 of the column 9, the units drop until they meet the last unit collected within the column, that is to say the uppermost unit.

At the exit of the column 9, that is to say in its bottom part, there may be a means 14 for processing the units 2 individually in order to reference the units before conveying them toward a downstream machine. The constant supply of the processing means 14 is possible by virtue of the collection of the units within the column 9.

Such a processing means 4 may comprise a referencing wheel 8 as shown in FIG. 1, at the periphery of which there are substantially radial surfaces that are able to convey the units 2 one by one.

Thus, the invention makes it possible to best manage the supply of the column 9 on the basis of the knowledge of the exact quantity of closure units 2 expelled from the conveyor 6, in each housing 4. If the number of closure units 2 expelled is not enough to maintain the level within the supply column 9, the speed of the conveyor 6 is increased, and vice versa if this number is too high, in order to avoid excessive filling and overflowing of said supply column 9. The invention therefore makes it possible to anticipate as soon as possible the filling of the supply column 9 with closure units 2.

Although the above description is based on particular embodiments, this does not limit the scope of the invention in any way, and modifications can be made, in particular by the substitution of technical equivalents or by a different combination of all or some of the features set out above.

The invention claimed is:

1. A method for managing a module (1) for sorting units (2) of the stopper or cap or preform type, wherein:
   said units (2) are placed in loose form in a reservoir (3);
   said units (2) are sorted in an oriented manner into at least one batch inserted into at least one housing (4) by being lifted from said reservoir (3) toward an outlet (5) at a lifting speed;
   said batch of sorted units (2) is expelled from said outlet (5) of said housing (4) toward an inlet (8) of at least one vertical supply column (9), said expelled units (2) passing through a circulation zone (10) situated between said outlet (5) and said inlet (8), said circulation zone (10) for guiding a trajectory of the units (2) directly from the outlet (5) of the housing (4) downward to the inlet (8) of the vertical supply column (9);
   the method comprising:
   detecting the number of expelled units (2) per batch at said outlet (5) or at said inlet (8);
   increasing or decreasing the lifting speed depending on said detected number of units (2).

2. The management method as claimed in claim 1, further comprising detecting the number of expelled units (2) per batch at a point along said circulation zone (10).

3. The management method as claimed in claim 2, further comprising expelling the units (2) of a batch pneumatically and detecting said units (2) individually by counting.

4. The management method as claimed in claim 2, further comprising:
   expelling the units (2) of a batch mechanically by pushing them in an indexed manner from one end (11) as far as said outlet (5) and detecting said units (2):
   individually by counting; and/or by calculating the number of units (2) between said outlet (5) and the indexed position at the time of said pushing.

5. The management method as claimed in claim 1, further comprising expelling the units (2) of a batch pneumatically and detecting said units (2) individually by counting.

6. The management method as claimed in claim 1, further comprising:
- expelling the units (2) of a batch mechanically by pushing them in an indexed manner from one end (11) as far as said outlet (5) and detecting said units (2):
  - individually by counting; and/or
  - by calculating the number of units (2) between said outlet (5) and the indexed position at the time of said pushing.

7. A device for providing units, which comprises a module (1) for sorting units (2) of the stopper or cap or preform type, said sorting module (1) being provided with a reservoir (3) that receives said units (2) and with a conveyor (6) that is disposed upwardly and is driven at a lifting speed, said conveyor (6) comprising at least one housing (4) for receiving said units (2) in the form of a batch by insertion, said sorting module (1) also comprising an outlet (5) and expulsion device (13) for expelling toward said outlet (5) each batch of units (2) inserted into each housing (4), said sorting module (1) comprising a vertical supply column (9) provided with an inlet (8) and a circulation zone (10) for said units (2) that is situated between said outlet (5) and said inlet (8), said circulation zone (10) for guiding a trajectory of the units (2) directly from the outlet (5) of the housing (4) downward to the inlet (8) of the vertical supply column (9), the device for providing units further comprising:
- a detection unit for detecting the number of units (2) in each batch, said detection unit having at least one sensor (12) situated at said outlet (5) or at said inlet (8);
- controller for controlling the increase and the decrease in the lifting speed of said conveyor (6) depending on the number of units (2) detected.

8. The provision device as claimed in claim 7, wherein said detection unit further comprise a at least one sensor (12) situated at a point along said circulation zone (10).

9. The provision device as claimed in claim 8, wherein said expulsion device (13) have a pneumatic ejector, and in that at least one sensor (12) of said detection unit comprises at least one counting cell.

10. The provision device as claimed in claim 8, wherein said expulsion device (13) have a mechanical ejector in the form of a pusher that is movable in translation according to indexed positions along said housing (4), and in that at least one sensor (12) of said detection unit comprises:
- at least one counting cell; and/or
- a cell for detecting the presence of a unit (2) at said outlet (5), said detection unit comprising device for calculating the number of units (2) between said outlet (5) and said pusher at an indexed pushing position.

11. The provision device as claimed in claim 7, wherein said expulsion device (13) have a pneumatic ejector, and in that at least one sensor (12) of said detection unit comprises at least one counting cell.

12. The provision device as claimed in claim 7, wherein said expulsion device (13) have a mechanical ejector in the form of a pusher that is movable in translation according to indexed positions along said housing (4), and in that at least one sensor (12) of said detection unit comprises:
- at least one counting cell; and/or
- a cell for detecting the presence of a unit (2) at said outlet (5), said detection unit comprising device for calculating the number of units (2) between said outlet (5) and said pusher at an indexed pushing position.

\* \* \* \* \*